(12) United States Patent
Huang

(10) Patent No.: US 11,796,774 B2
(45) Date of Patent: Oct. 24, 2023

(54) INTERNAL FOCUS LARGE-APERTURE TELEPHOTO LENS

(71) Applicant: Shenzhen Jueying Technology Co., Ltd., Shenzhen (CN)

(72) Inventor: Muji Huang, Shenzhen (CN)

( * ) Notice: Subject to any disclaimer, the term of this patent is extended or adjusted under 35 U.S.C. 154(b) by 233 days.

(21) Appl. No.: 17/337,455

(22) Filed: Jun. 3, 2021

(65) Prior Publication Data

US 2022/0342187 A1 Oct. 27, 2022

(30) Foreign Application Priority Data

Apr. 21, 2021 (CN) .............................. 202110430879

(51) Int. Cl.
*G02B 13/02* (2006.01)
(52) U.S. Cl.
CPC ..................... *G02B 13/02* (2013.01)
(58) Field of Classification Search
CPC .... G02B 13/02; G02B 13/005; G02B 13/006; G02B 15/144105; G02B 15/16
See application file for complete search history.

(56) References Cited

U.S. PATENT DOCUMENTS

| 4,368,954 | A  | * | 1/1983  | Tsuji    | G02B 15/173    |
|           |    |   |         |          | 359/686        |
| 6,320,702 | B1 | * | 11/2001 | Yonezawa | G02B 21/025    |
|           |    |   |         |          | 359/380        |
| 2008/0225406 | A1 | * | 9/2008 | Wada   | G02B 7/105     |
|           |    |   |         |          | 359/694        |
| 2012/0050885 | A1 | * | 3/2012 | Onozaki | G02B 15/144105 |
|           |    |   |         |          | 359/686        |
| 2014/0029111 | A1 | * | 1/2014 | Shibata | G02B 15/144511 |
|           |    |   |         |          | 359/686        |

\* cited by examiner

*Primary Examiner* — Robert E. Tallman

(57) ABSTRACT

An internal focus large-aperture telephoto lens including, sequentially from an object side to an image side, a first lens assembly with positive focal power, a second lens assembly with negative focal power, an aperture stop, a third lens assembly with positive focal power, and a fourth lens assembly with negative focal power; the first lens assembly, the second lens assembly, the third lens assembly and the fourth lens assembly are all spherical lenses; when focusing from infinity to proximity, the second lens assembly moves along an optical axis towards the image side, the third lens assembly moves along the optical axis towards the object side, the first lens assembly and the fourth lens assembly remain static in position in relation to the image side. The present invention utilizes internal double lens movement to focus, thereby achieving high magnification and high resolution and increasing focusing speed.

11 Claims, 9 Drawing Sheets

INTERNAL FOCUS LARGE-APERTURE TELEPHOTO LENS

BACKGROUND OF THE INVENTION

The present invention relates to the technical field of optical imaging and more particularly pertains to an internal focus large-aperture telephoto lens.

Recently, in the photography market, demand for mirrorless cameras has been increasing rapidly. In comparison to single lens reflex cameras which are large in size and low in portability, mirrorless cameras are small in size and high in portability as it has no reflector component. Moreover, the development and maturity of high precision CMOS chips result in the improvement in the resolution of cameras, so that mirrorless cameras have fairly high imaging quality.

However, apart from high precision CMOS chips, high resolution telephoto lenses are also required to achieve high imaging quality. At present, there is a high demand in the market for lens with good imaging quality. Besides, as the users in general are ordinary photography enthusiasts, a high cost performance ratio is desired. In view of the above, numerous limitations exist in the design of mirrorless cameras.

BRIEF SUMMARY OF THE INVENTION

In view of the aforesaid disadvantages now present in the prior art and the market demand, the present invention provides an internal focus large-aperture telephoto lens with high resolution and large magnification. It utilizes internal double lens movement to focus, and has the advantages of high focus speed and good optical imaging capability.

In order to attain the above objects, the present invention provides the following technical solutions:

An internal focus large-aperture telephoto lens comprising, sequentially from an object side to an image side, a first lens assembly with positive focal power, a second lens assembly with negative focal power, an aperture stop, a third lens assembly with positive focal power, and a fourth lens assembly with negative focal power; the first lens assembly, the second lens assembly, the third lens assembly and the fourth lens assembly are all spherical lenses;

when focusing from infinity to proximity, the second lens assembly moves along an optical axis towards the image side, the third lens assembly moves along the optical axis towards the object side, the first lens assembly and the fourth lens assembly remain static in position in relation to the image side;

the first lens assembly comprises at least one meniscus lens and satisfies conditional expression as follows:

$$0.3 \leq F1/F \leq 1, \quad (1);$$

wherein, F represents focal length of the telephoto lens; F1 represents combined focal length of the first lens assembly.

Preferably, the first lens assembly comprises, sequentially from the object side to the image side, a first lens with positive focal power, a second lens with positive focal power, a third lens with positive focal power, a fourth lens with negative focal power, a fifth lens with negative focal power and a sixth lens with positive focal power; the third lens and the fourth lens are combined to form a cemented lens assembly; the fifth lens and the sixth lens are combined to form a cemented lens assembly; the second lens and the sixth lens are meniscus lenses; the first lens, the second lens, the third lens and the sixth lens are extra-low dispersion lens.

Preferably, the first lens assembly comprises at least one lens with Vd1≥70, wherein Vd1 is defined as Abbe number of a light beam with wavelength of 587.6 nm of the lens, and the first lens assembly satisfies conditional expression as follows:

$$(Vd1a - Vd1b) \geq 30, \quad (2);$$

wherein Vd1a is Abbe number of the light beam with wavelength of 587.6 nm of the lens of the highest Abbe number in the first lens assembly; Vd1b is Abbe number of the light beam with wavelength 587.6 nm of the lens of the lowest Abbe number in the first lens assembly.

Preferably, the second lens assembly comprises, sequentially from the object side to the image side, a seventh lens with positive focal power, an eighth lens with negative focal power and a ninth lens with negative focal power; the seventh lens and the eighth lens are combined to form a cemented lens assembly.

Preferably, the second lens assembly has a first lens surface which is proximal to the object side and convex towards the object side, and a second lens surface which is proximal to the image side and concave towards the object side.

Preferably, the second lens assembly satisfies conditional expression as follows:

$$-0.9 \leq F2/F \leq 0, \quad (3);$$

wherein F represents focal length of the telephoto lens; F2 represents combined focal length of the second lens assembly.

Preferably, the third lens assembly comprises, sequentially from the object side to the image side, a tenth lens with positive focal power and an eleventh lens with negative focal power; the tenth lens and the eleventh lens are combined to form a cemented lens assembly.

Preferably, the fourth lens assembly comprises, sequentially from the object side to the image side, a twelfth lens with negative focal power, a thirteenth lens with positive focal power and a fourteenth lens with negative focal power; the twelfth lens and the thirteenth lens are combined to form a cemented lens assembly.

Preferably, the fourth lens assembly comprises, sequentially from the object side to the image side, a twelfth lens with positive focal power and a thirteenth lens with negative focal power.

Preferably, the fourth lens assembly satisfies conditional expression as follows:

$$-3 \leq F3/F4 \leq 0, \quad (4);$$

wherein F3 represents combined focal length of the third lens assembly; F4 represents combined focal length of the fourth lens assembly.

In comparison to the prior art, the present invention has the following beneficial effects:

The telephoto lens of the present invention utilizes internal double lens movement to focus, which is beneficial for adjusting aberration introduced during close-up shooting, thereby achieving high magnification and high resolution. Besides, the third lens assembly comprises only two lenses, which is beneficial in reducing the weight of the focusing component and increasing focusing speed. Furthermore, all lenses are spherical, which is beneficial in reducing costs and increasing cost performance ratio. Some of the lenses in the first lens assembly are extra-low dispersion lenses, and one of the lenses satisfies the conditional expression Vd1≥70, and the first lens assembly satisfies the conditional expression (Vd1a−Vd1b)≥30, (2), resulting in better compensation of axial chromatic aberration and reduction in dispersion of in-focus and out-of-focus pictures.

To illustrate clearly the structural characteristics, technical means and the objectives and functions achieved thereby, the present invention is further described herein with the accompanying drawings and embodiments:

DETAILED DESCRIPTION OF THE INVENTION

Figure 1:
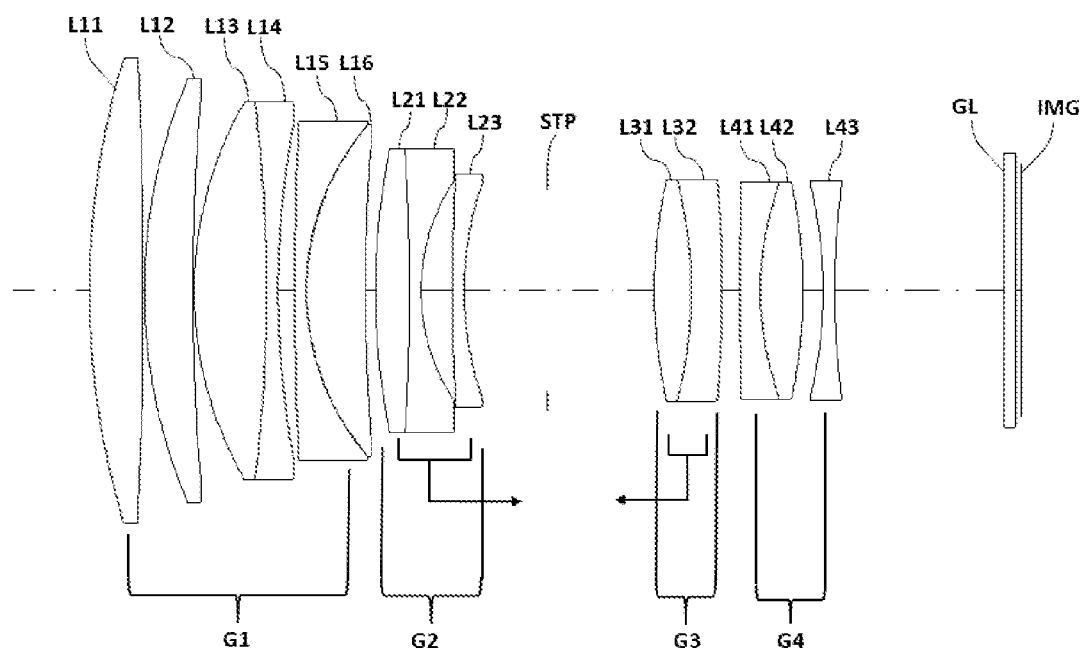
FIG. 1 is a schematic illustration according to Embodiment 1.

It should be understood that, in the description below, terms indicating directions or positional references such as "in the middle", "upper", "lower", "left", "right", "vertical", "horizontal", "inner" and "outer" should be understood based on the directions or positional references shown according to the figures. These terms are used merely for the ease of describing the invention and for simplifying the description, and should not be understood to indicate or suggest that the positions or elements referred to must be oriented to specific directions or be configured and operated according to the specific directions, and thus these terms should not be considered limiting the present invention.

As shown in FIGS. 1-21, the internal focus large-aperture telephoto lens comprises, sequentially from an object side to an image side, a first lens assembly G1 with positive focal power, a second lens assembly G2 with negative focal power, an aperture stop STP, a third lens assembly G3 with positive focal power, and a fourth lens assembly G4 with negative focal power. The first lens assembly G1, the second lens assembly G2, the third lens assembly G3 and the fourth lens assembly G4 are all spherical lenses. When focusing from infinity to proximity, the second lens assembly G2 moves along an optical axis towards the image side, the third lens assembly G3 moves along the optical axis towards the object side, the first lens assembly G1 and the fourth lens assembly G4 remain static in position in relation to the image side. In order to adjust axial chromatic aberration, the first lens assembly G1 comprises at least one meniscus lens, and at least one lens with Vd1≥70; the first lens assembly G1 satisfies conditional expression as follows:

$$0.3 \leq F1/F \leq 1, \tag{1};$$

$$(Vd1a - Vd1b) \geq 30, \tag{2};$$

wherein, F represents focal length of the telephoto lens; F1 represents combined focal length of the first lens assembly G1; Vd1 is defined as Abbe number of a light beam with wavelength of 587.6 nm of the lens; Vd1a is Abbe number of the light beam with wavelength of 587.6 nm of the lens of the highest Abbe number in the first lens assembly G1; Vd1b is Abbe number of the light beam with wavelength 587.6 nm of the lens of the lowest Abbe number in the first lens assembly G1.

The first lens assembly G1 comprises, sequentially from the object side to the image side, a first lens L11 with positive focal power, a second lens L12 with positive focal power, a third lens L13 with positive focal power, a fourth lens L14 with negative focal power, a fifth lens L15 with negative focal power and a sixth lens L16 with positive focal power. The third lens L13 and the fourth lens L14 are combined to form a cemented lens assembly; the fifth lens L15 and the sixth lens L16 are combined to form a cemented lens assembly; the second lens L12 and the sixth lens L16 are meniscus lenses; the first lens L11, the second lens L12, the third lens L13 and the sixth lens L16 are extra-low dispersion lens; with the use of low dispersion lens, good axial chromatic aberration adjustment can be achieved, thereby reducing dispersion of in-focus and out-of-focus pictures.

The second lens assembly G2 comprises, sequentially from the object side to the image side, a seventh lens L21 with positive focal power, an eighth lens L22 with negative focal power and a ninth lens L23 with negative focal power. The seventh lens L21 and the eighth lens L22 are combined to form a cemented lens assembly. The second lens assembly G2 has a first lens surface which is proximal to the object side and convex towards the object side, and a second lens surface which is proximal to the image side and concave towards the object side. The second lens assembly G2 satisfies conditional expression as follows:

$$-0.9 \leq F2/F \leq 0, \tag{3};$$

wherein F represents focal length of the telephoto lens; F2 represents combined focal length of the second lens assembly G2.

The third lens assembly G3 comprises, sequentially from the object side to the image side, a tenth lens L31 with positive focal power and an eleventh lens L32 with negative focal power; the tenth lens L31 and the eleventh lens L32 are combined to form a cemented lens assembly. The fourth lens assembly G4 satisfies conditional expression as follows:

$$-3 \leq F3/F4 \leq 0, \quad (4);$$

wherein F3 represents combined focal length of the third lens assembly G3; F4 represents combined focal length of the fourth lens assembly G4.

To achieve high magnification and high resolution, it is necessary to focus by means of internal double lens movement. When focusing from infinity to proximity, the second lens assembly G2 moves along the optical axis towards the image side, the third lens assembly G3 moves along the optical axis towards the object side, thus the second lens assembly G2 and the third lens assembly G3 move differentially towards each other when focusing. The aforementioned focusing method is beneficial for adjusting aberration introduced during close-up shooting, and exhibits relatively good inhibition especially for curvature of field. Therefore, it is possible to achieve high magnification and high resolution at the same time. Besides, the second lens assembly G2 and the third lens assembly G3 are used for focusing. As the aperture, size and number of lenses of these two lens assembly are relatively small, particularly the third lens assembly G3 has only two lenses, the overall weight is lower than that of the first lens assembly G1 and the fourth lens assembly G4, thereby beneficial in increasing focusing speed and achieve quick focusing.

Embodiment 1

FIG. 1 illustrates the structure of the telephoto lens of Embodiment 1. In this embodiment, the fourth lens assembly G4 comprises, sequentially from the object side to the image side, a twelfth lens L41 with negative focal power, a thirteenth lens L42 with positive focal power and a fourteenth lens L43 with negative focal power. The twelfth lens L41 and the thirteenth lens L42 are combined to form a cemented lens assembly.

The numeric parameters of the telephoto lens are shown in Table 1 and Table 2 as follows:

TABLE 1

Embodiment 1 Optical Data

| Surface serial number | Surface type | Curvature radius R | Thickness | Refractive index Nd | Abbe number Vd |
|---|---|---|---|---|---|
| Object |  | Infinity | Infinity |  |  |
| 1 | Spherical | 116.09 | 8.22 | 1.5928 | 68.3459 |
| 2 | Spherical | −667.09 | 0.2 |  |  |
| 3 | Spherical | 61.64 | 8.34 | 1.437809 | 94.5768 |
| 4 | Spherical | 308.58 | 0.2 |  |  |
| 5 | Spherical | 64.71 | 12.43 | 1.496998 | 81.5947 |
| 6 | Spherical | −207.83 | 2 | 1.883004 | 40.8069 |
| 7 | Spherical | 126.11 | 2.85 |  |  |
| 8 | Spherical | 611.09 | 2 | 1.51637 | 64.08 |
| 9 | Spherical | 43.34 | 10.17 | 1.5928 | 68.3459 |
| 10 | Spherical | 229.6 | D1 |  |  |
| 11 | Spherical | 120.97 | 5.81 | 1.922866 | 20.8821 |
| 12 | Spherical | −369.42 | 2 | 1.595512 | 39.228 |
| 13 | Spherical | 32.264 | 5.4 |  |  |
| 14 | Spherical | 380.09 | 2 | 1.51742 | 52.189 |
| 15 | Spherical | 56.41 | D2 |  |  |
| STP | Spherical | Infinity | D3 |  |  |
| 17 | Spherical | 80.81 | 5.33 | 1.7199 | 43.69 |
| 18 | Spherical | −74.27 | 5.31 | 1.805 | 25.47 |
| 19 | Spherical | −219.8 | D4 |  |  |
| 20 | Spherical | 603.09 | 3.51 | 1.603423 | 38.0091 |
| 21 | Spherical | 51.94 | 7.34 | 1.589129 | 61.2458 |
| 22 | Spherical | −82.71 | 3.44 |  |  |

TABLE 1-continued

Embodiment 1 Optical Data

| Surface serial number | Surface type | Curvature radius R | Thickness | Refractive index Nd | Abbe number Vd |
|---|---|---|---|---|---|
| 23 | Spherical | −68.08 | 3.44 | 1.523074 | 58.6581 |
| 24 | Spherical | 132.99 | 29 |  |  |
| 27 | Spherical | Infinity | 2 | 1.516798 | 64.1983 |
| 28 | Spherical | Infinity | 1 |  |  |
| IMAGE |  | Infinity |  |  |  |

TABLE 2

Embodiment 1 Focus Data

| Object Distance | Infinity | Nearest (0.56 m) |
|---|---|---|
| Focal Length | 131 | 105 |
| D1 | 1.72 | 10.3 |
| D2 | 14.33 | 5.75 |
| D3 | 18.35 | 1.34 |
| D4 | 3.07 | 20.08 |

In the table, Surface Serial Number indicates the surface serial number of the lenses from the object side to the image side.

Figure 2:
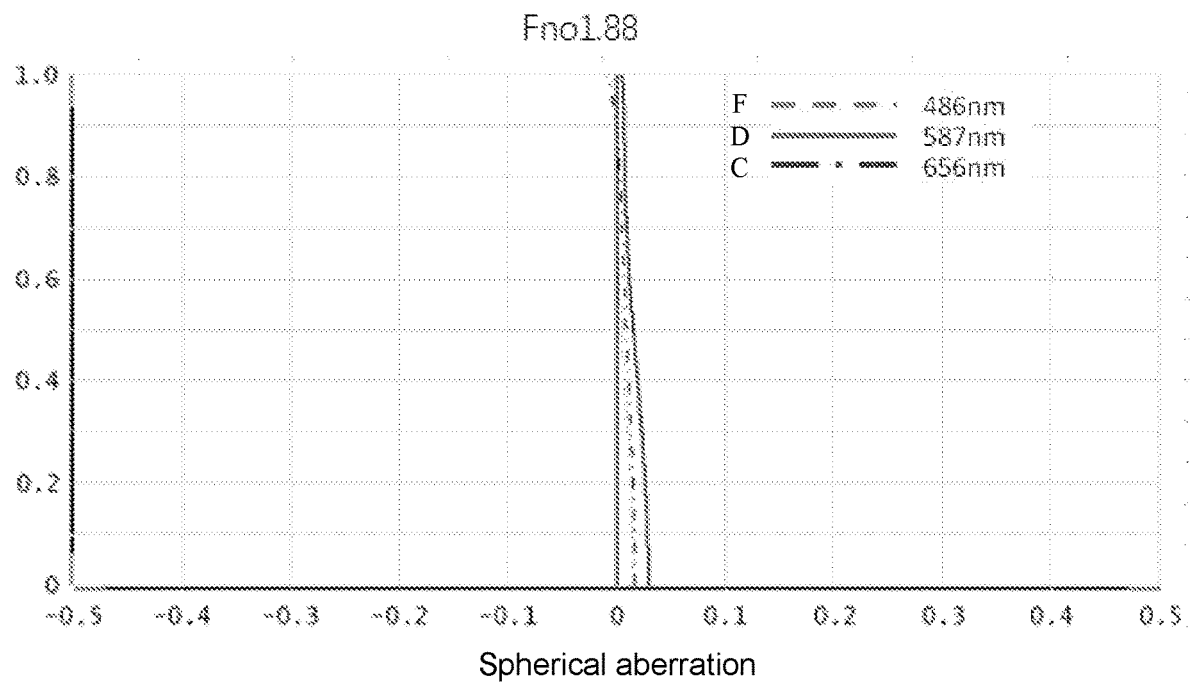
FIG. 2 shows the spherical aberration chart of Embodiment 1 when focusing at infinity.
Figure 3:
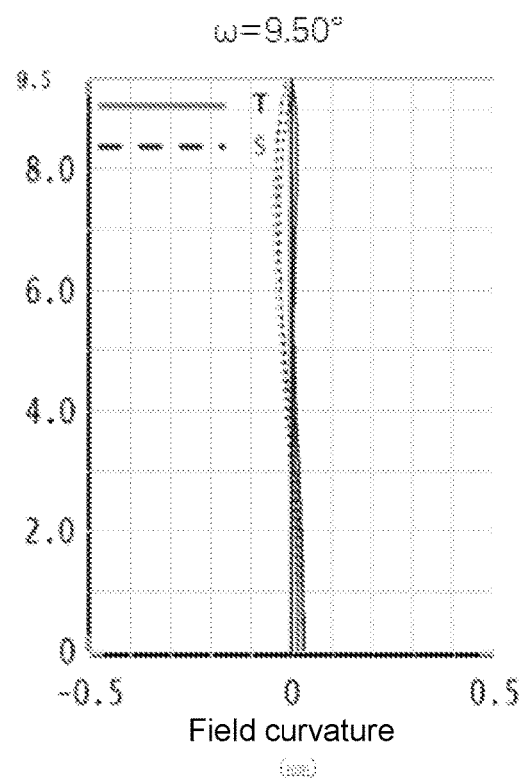
FIG. 3 shows the field curvature chart of Embodiment 1 when focusing at infinity.
Figure 4:
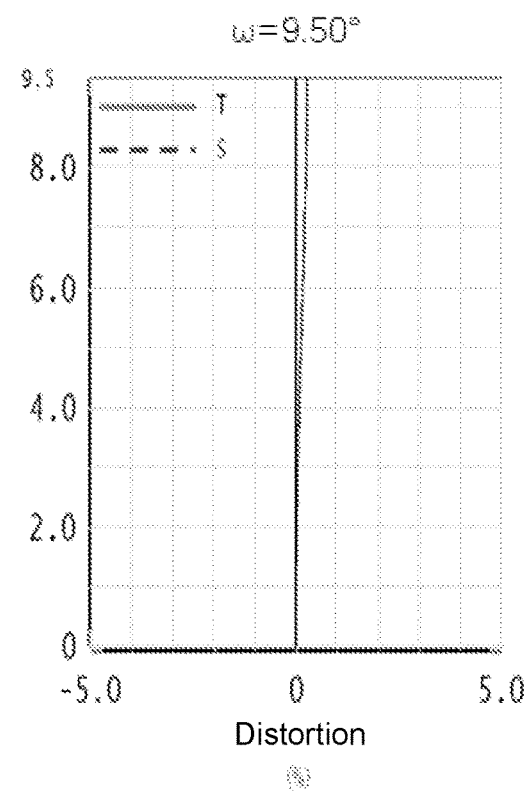
FIG. 4 shows the distortion chart of Embodiment 1 when focusing at infinity.
Figure 5:
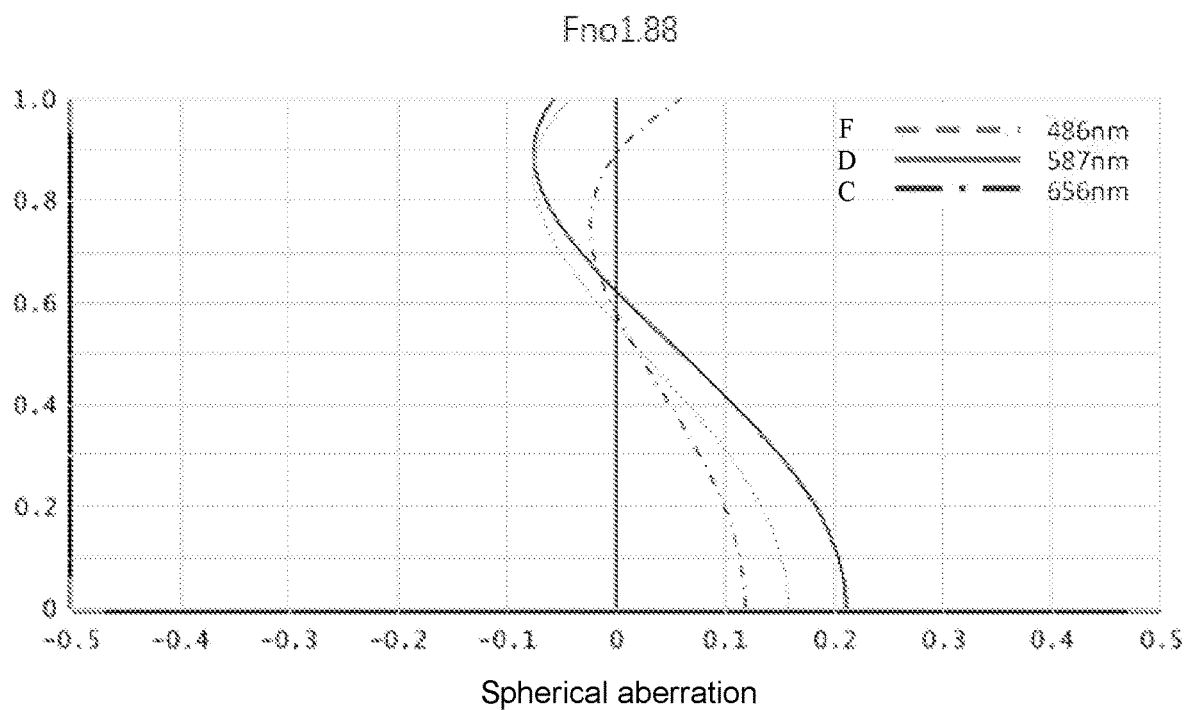
FIG. 5 spherical aberration chart of Embodiment 1 when focusing at the nearest distance.
Figure 6:
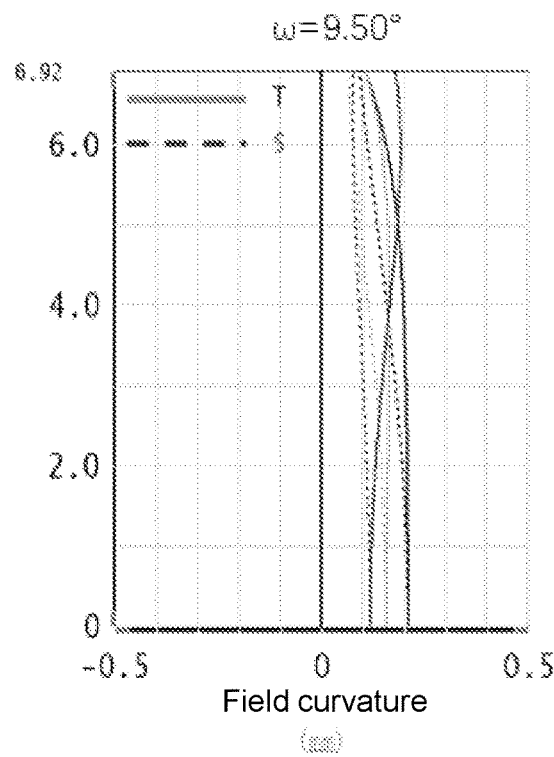
FIG. 6 shows the field curvature chart of Embodiment 1 when focusing at the nearest distance.
Figure 7:
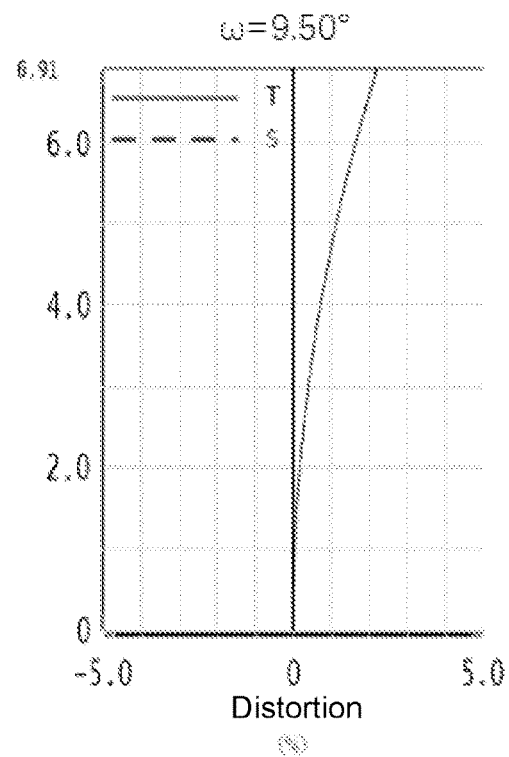
FIG. 7 shows the distortion chart of Embodiment 1 when focusing at the nearest distance.

FIGS. 2-4 show the spherical aberration, field curvature and distortion charts of Embodiment 1 when focusing at infinity. FIGS. 5-7 show the spherical aberration, field curvature and distortion charts of Embodiment 1 when focusing at the nearest distance.

The spherical aberration charts show the spherical aberration curves when the aperture number is 1.88, wherein the F curves, the D curves and the C curves represent the spherical aberration at wavelengths 486 nm, 587 nm and 656 nm respectively, the x-coordinates represent spherical aberration values and the y-coordinates represent the field of view values. The field curvature charts show the field curvature curves when the half field of view w is 9.5°, wherein the S lines represent the values of the chief ray d at sagittal image plane, the T lines represent the values of the chief ray d at meridian image plane, the x-coordinates represent the field curvature values, and the y-coordinates represent the field of view values. The distortion charts show the distortion curves when the half field of view w is 9.5°, wherein the x-coordinates represent the distortion values and the y-coordinates represent the field of view values. The descriptions of the spherical aberration, field curvature and distortion charts of other embodiments are the same as aforementioned and thus will not be repeated herein. As shown in FIGS. 2-7, the telephoto lens of Embodiment 1 has good imaging effect.

Embodiment 2

Figure 8:
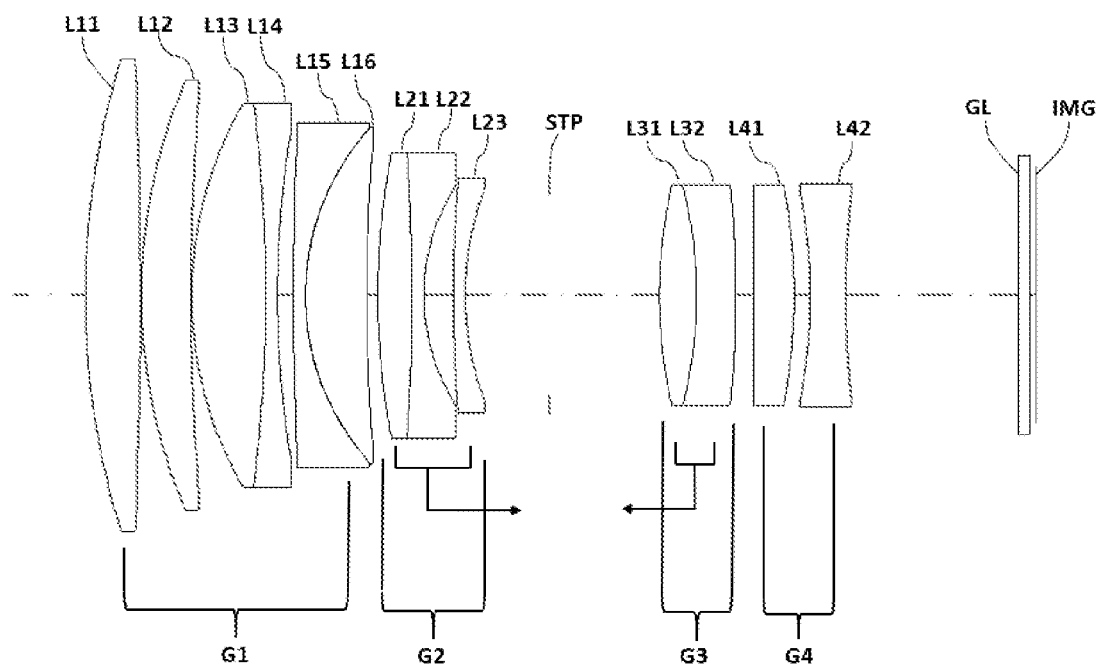
FIG. 8 is a schematic illustration according to Embodiment 2.

FIG. 8 illustrates the structure of the telephoto lens of Embodiment 2. In this embodiment, the fourth lens assembly G4 comprises, sequentially from the object side to the image side, a twelfth lens L41 with positive focal power and a thirteenth lens L42 with negative focal power. The numeric parameters of the telephoto lens of the present embodiment are shown in Table 3 and Table 4 as follows:

TABLE 3

Embodiment 2 Optical Data

| Surface serial number | Surface type | Curvature radius R | Thickness | Refractive index Nd | Abbe number Vd |
|---|---|---|---|---|---|
| Object |  | Infinity | Infinity |  |  |
| 1 | Spherical | 113.5 | 9.26 | 1.5928 | 68.3459 |
| 2 | Spherical | −647.65 | 0.2 |  |  |
| 3 | Spherical | 91.46 | 8.29 | 1.437803 | 94.5768 |
| 4 | Spherical | 588.53 | 0.2 |  |  |
| 5 | Spherical | 64.69 | 12.42 | 1.496998 | 81.5947 |
| 6 | Spherical | −257.83 | 2 | 1.83481 | 42.7275 |
| 7 | Spherical | 169.86 | 2.71 |  |  |
| 8 | Spherical | 606.67 | 2 | 1.517419 | 52.189 |
| 9 | Spherical | 42.18 | 10.27 | 1.603001 | 65.4596 |
| 10 | Spherical | 308.86 | 1.88 |  |  |
| 11 | Spherical | 106.5 | 5.75 | 1.846666 | 23.7873 |
| 12 | Spherical | −332.48 | 2 | 1.581439 | 40.7493 |
| 13 | Spherical | 34.58 | 4.96 |  |  |
| 14 | Spherical | 826.5 | 2 | 1.517419 | 52.189 |
| 15 | Spherical | 50.11 | 14.21 |  |  |
| STP | Spherical | Infinity | 18.5 |  |  |
| 17 | Spherical | 183.94 | 6.24 | 1.785901 | 44.2067 |
| 18 | Spherical | −74.27 | 6.53 | 1.84667 | 23.7912 |
| 19 | Spherical | −514.3 | 2.94 |  |  |
| 20 | Spherical | Infinity | 6.93 | 1.7 | 48.1099 |
| 21 | Spherical | −97.27 | 2.69 |  |  |
| 22 | Spherical | −91.66 | 6 | 1.647693 | 33.8423 |
| 23 | Spherical | 458.76 | 29 |  |  |
| 26 | Spherical | Infinity | 2 | 1.516798 | 64.1983 |
| 27 | Spherical | Infinity | 1 |  |  |
| IMAGE |  | Infinity |  |  |  |

TABLE 4

Embodiment 2 Focus Data

| Object Distance | Infinity | Nearest (0.56 m) |
|---|---|---|
| Focal Length | 131 | 105 |
| D1 | 1.88 | 10.07 |
| D2 | 14.21 | 6.01 |
| D3 | 18.50 | 1.21 |
| D4 | 2.94 | 20.23 |

Figure 9:
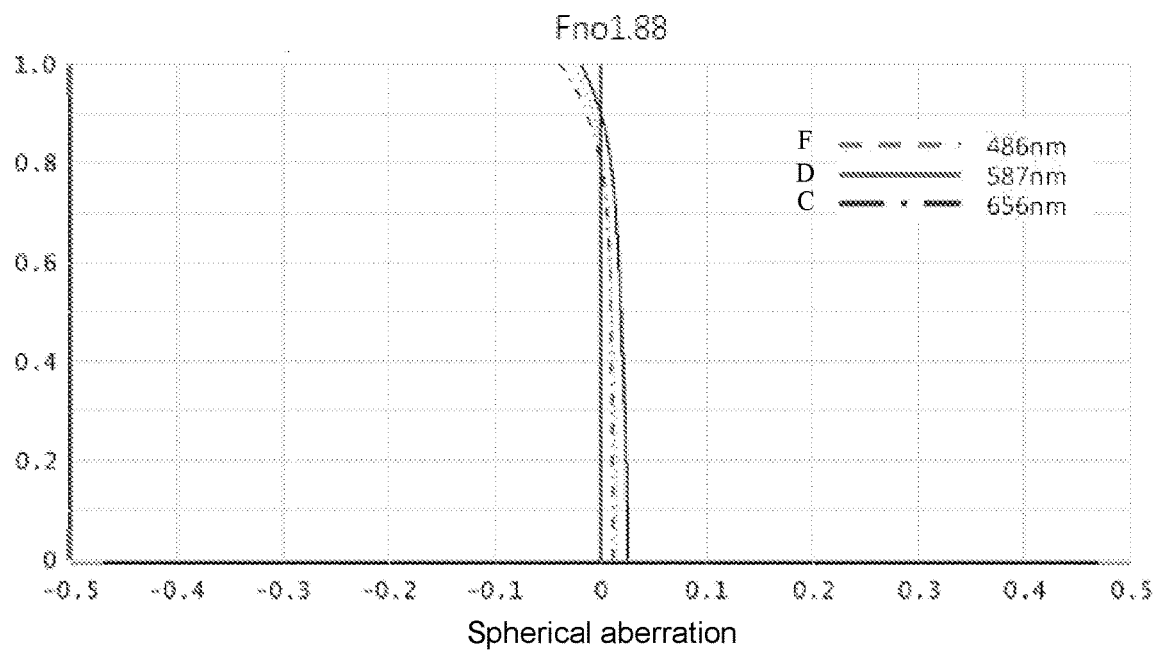
FIG. 9 shows the spherical aberration chart of Embodiment 2 when focusing at infinity.
Figure 10:
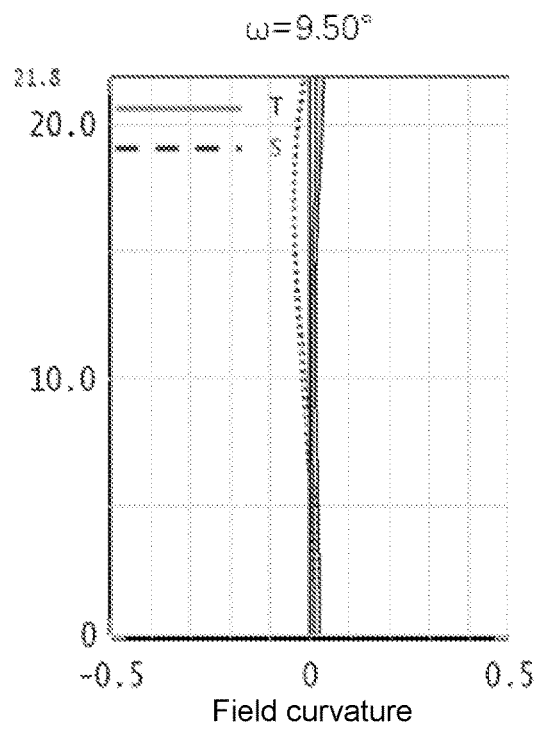
FIG. 10 shows the field curvature chart of Embodiment 2 when focusing at infinity.
Figure 11:
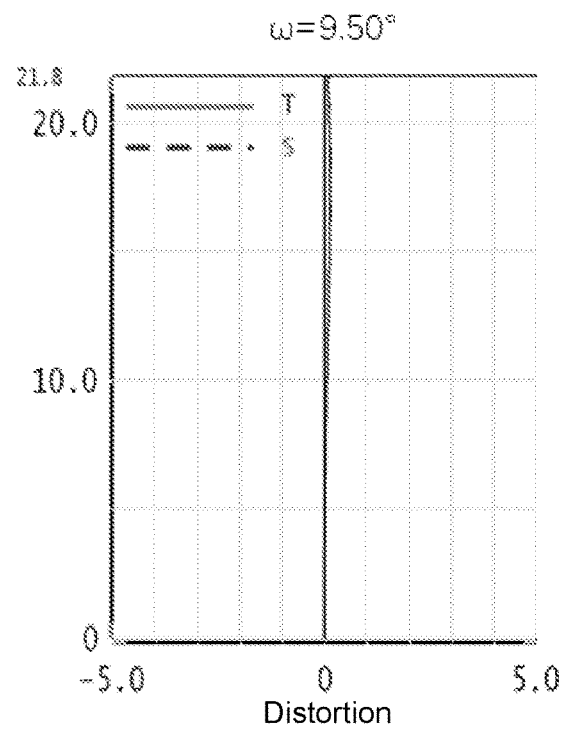
FIG. 11 shows the distortion chart of Embodiment 2 when focusing at infinity.
Figure 12:
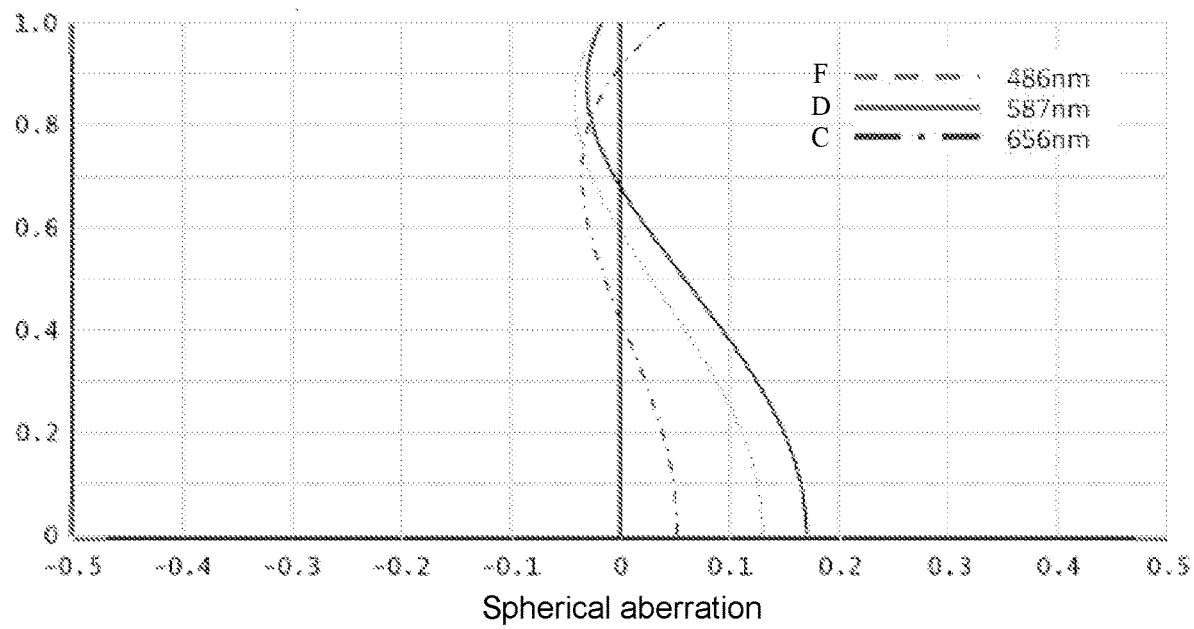
FIG. 12 shows the spherical aberration chart of Embodiment 2 when focusing at the nearest distance.
Figure 13:
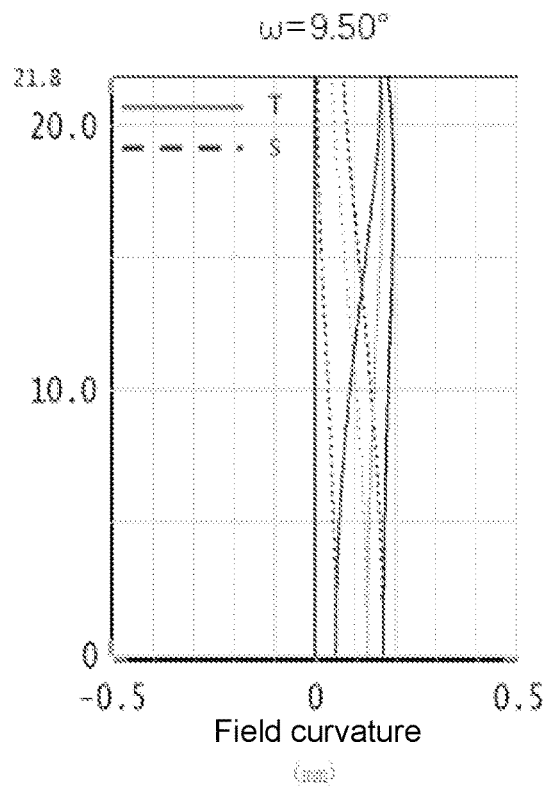
FIG. 13 shows the field curvature chart of Embodiment 2 when focusing at the nearest distance.
Figure 14:
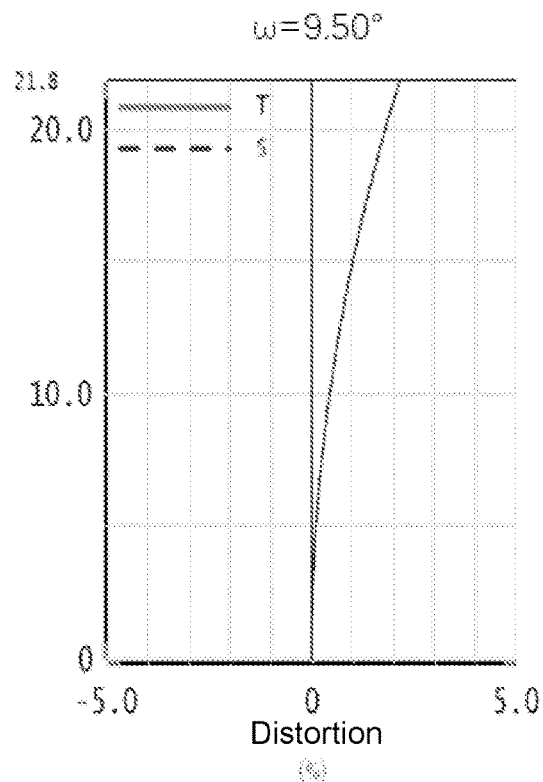
FIG. 14 shows the distortion chart of Embodiment 2 when focusing at the nearest distance.

FIGS. 9-11 show the spherical aberration, field curvature and distortion charts of Embodiment 2 when focusing at infinity. FIGS. 12-14 show the spherical aberration, field curvature and distortion charts of Embodiment 2 when focusing at the nearest distance. As shown in FIGS. 9-14, the telephoto lens of the present embodiment has good imaging effect.

Embodiment 3

Figure 15:
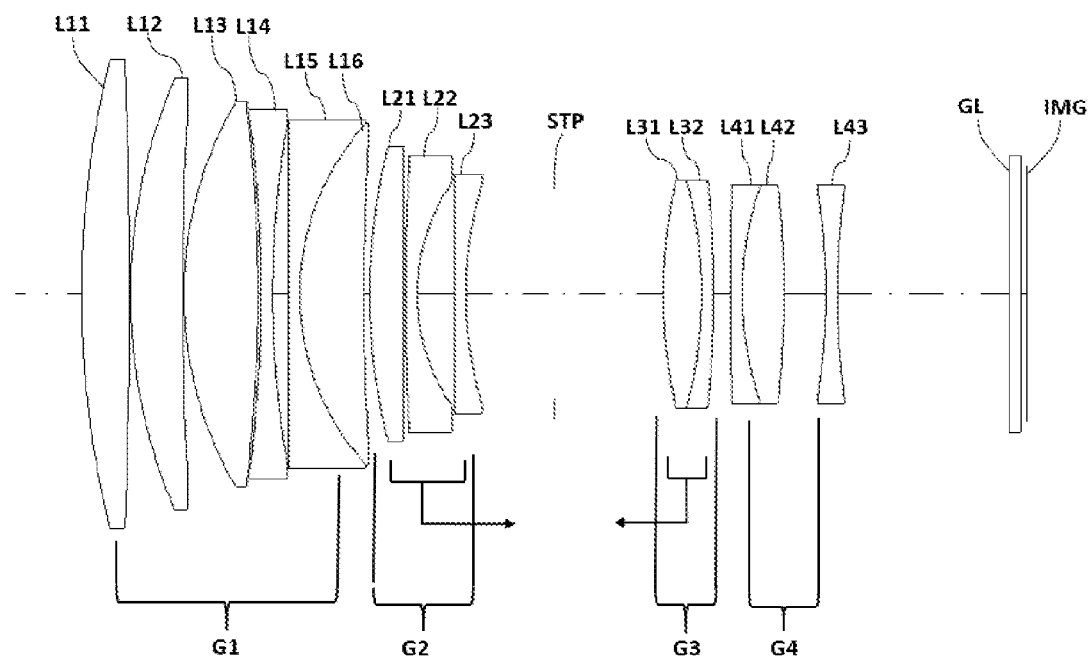
FIG. 15 is a schematic illustration according to Embodiment 3.

FIG. 15 illustrates the structure of the telephoto lens of Embodiment 3. In this embodiment, the fourth lens assembly G4 comprises, sequentially from the object side to the image side, a twelfth lens L41 with negative focal power, a thirteenth lens L42 with positive focal power and a fourteenth lens L43 with negative focal power. The twelfth lens L41 and the thirteenth lens L42 are combined to form a cemented lens assembly. The numeric parameters of the telephoto lens of the present embodiment are shown in Table 5 and Table 6 as follows:

TABLE 5

Embodiment 3 Optical Data

| Surface serial number | Surface type | Curvature radius R | Thickness | Refractive index Nd | Abbe number Vd |
|---|---|---|---|---|---|
| Object |  | Infinity | Infinity |  |  |
| 1 | Spherical | 194.75 | 8.11 | 1.592 | 68.346 |
| 2 | Spherical | −554.68 | 0.2 |  |  |
| 3 | Spherical | 193.15 | 8.85 | 1.437 | 94.523 |
| 4 | Spherical | 458.81 | 0.2 |  |  |
| 5 | Spherical | 165.22 | 12.53 | 1.487 | 70.419 |
| 6 | Spherical | −200.68 | 0.5 |  |  |
| 7 | Spherical | −208.3 | 2 | 1.903 | 31.318 |
| 8 | Spherical | 170.12 | 2.58 |  |  |
| 9 | Spherical | 1232.28 | 2 | 1.516 | 64.212 |
| 10 | Spherical | 143.02 | 10.85 | 1.592 | 68.345 |
| 11 | Spherical | 417.86 | D1 |  |  |
| 12 | Spherical | 83.31 | 5.73 | 1.846 | 23.787 |
| 13 | Spherical | Infinity | 0.3 |  |  |
| 14 | Spherical | 65.23 | 2 | 1.548 | 45.832 |
| 15 | Spherical | 53.68 | 6.21 |  |  |
| 16 | Spherical | 500.88 | 2 | 1.569 | 49.448 |
| 17 | Spherical | 164.42 | D2 |  |  |
| STP | Spherical | Infinity | D3 |  |  |
| 19 | Spherical | 58.76 | 6.45 | 1.743 | 49.238 |
| 20 | Spherical | −94.27 | 2 | 1.805 | 25.477 |
| 21 | Spherical | −398.69 | D4 |  |  |
| 22 | Spherical | 1506.63 | 2 | 1.639 | 34.469 |
| 23 | Spherical | 156.25 | 7.1 | 1.589 | 61.245 |
| 24 | Spherical | −502.48 | 7.05 |  |  |
| 25 | Spherical | −101.63 | 2 | 1.523 | 58.658 |
| 26 | Spherical | 106.46 | 29 |  |  |
| 28 | Spherical | Infinity | 2 | 1.516 | 64.198 |
| 29 | Spherical | Infinity | 1 |  |  |
| IMAGE |  | Infinity |  |  |  |

TABLE 6

Embodiment 3 Focus Data

| Object Distance | Infinity | Nearest (0.56 m) |
|---|---|---|
| Focal Length | 131 | 105 |
| D1 | 1.00 | 10.457 |
| D2 | 15.011 | 5.556 |
| D3 | 18.458 | 1.124 |
| D4 | 2.864 | 20.198 |

Figure 16:
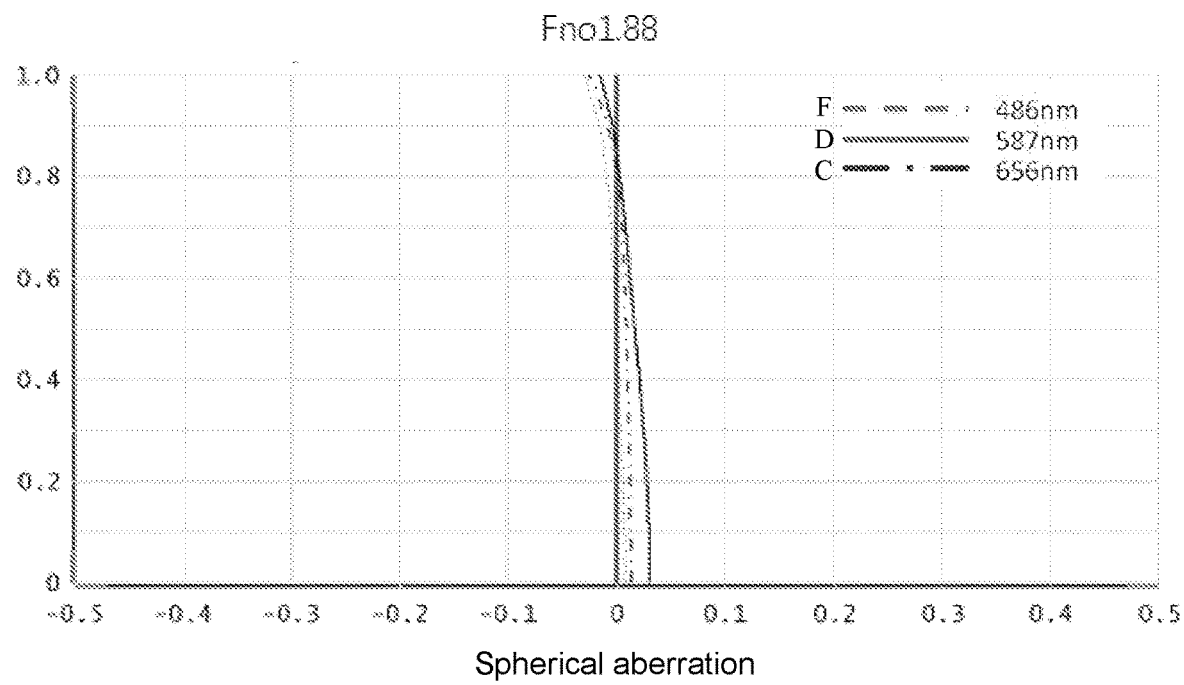
FIG. 16 shows the spherical aberration chart of Embodiment 3 when focusing at infinity.
Figure 17:
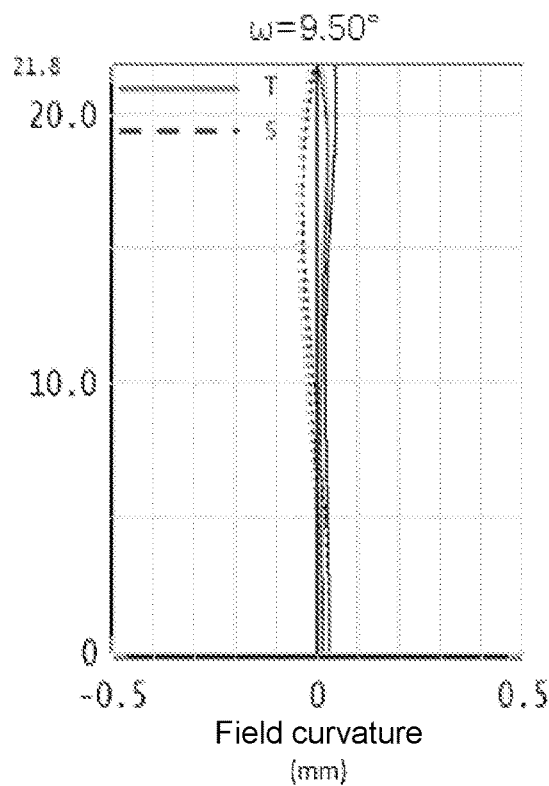
FIG. 17 shows the field curvature chart of Embodiment 3 when focusing at infinity.
Figure 18:
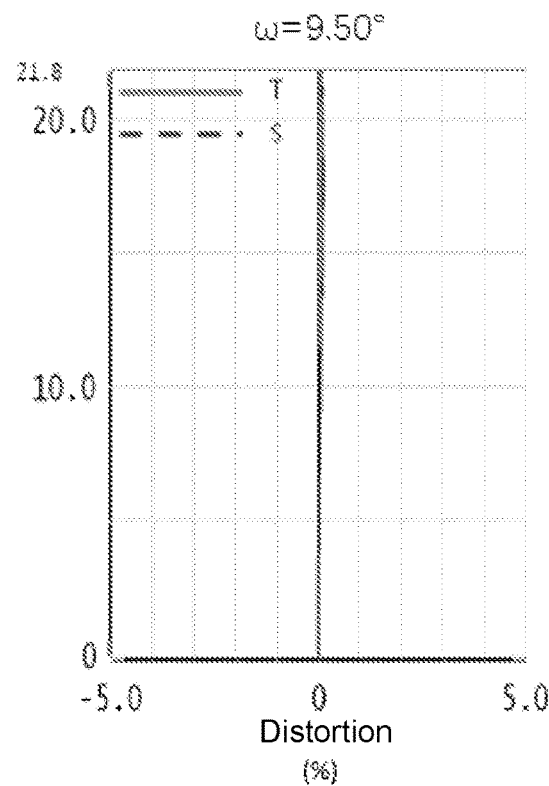
FIG. 18 shows the distortion chart of Embodiment 3 when focusing at infinity.
Figure 19:
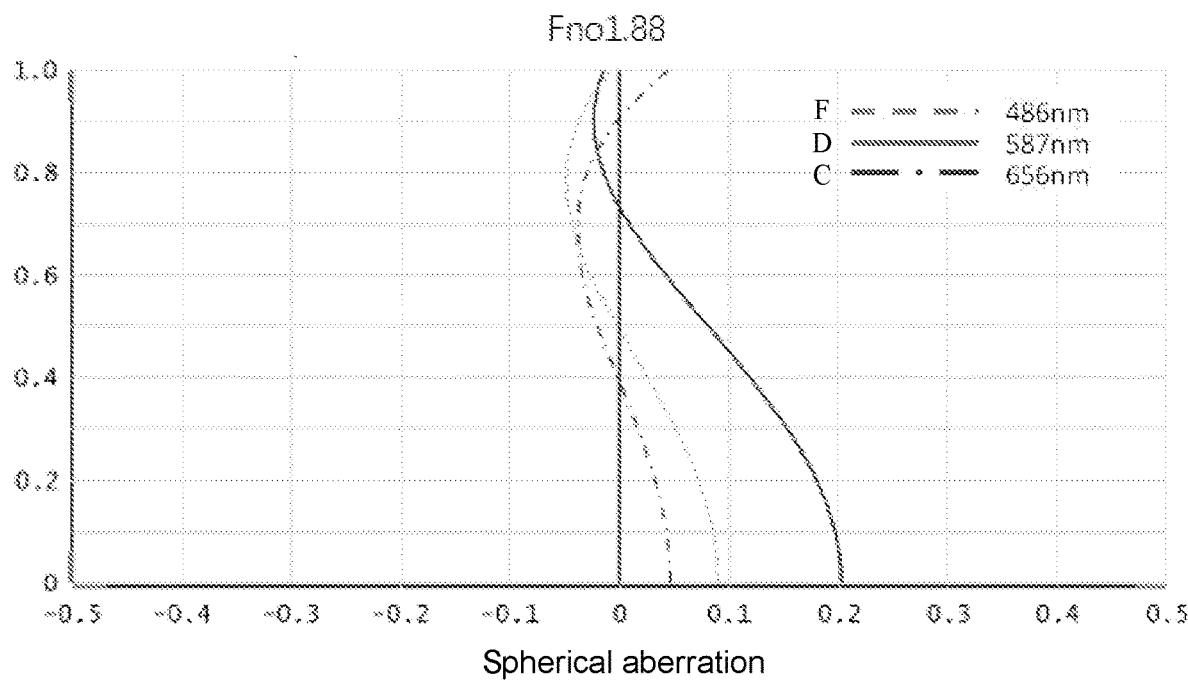
FIG. 19 shows the spherical aberration chart of Embodiment 3 when focusing at the nearest distance.
Figure 20:
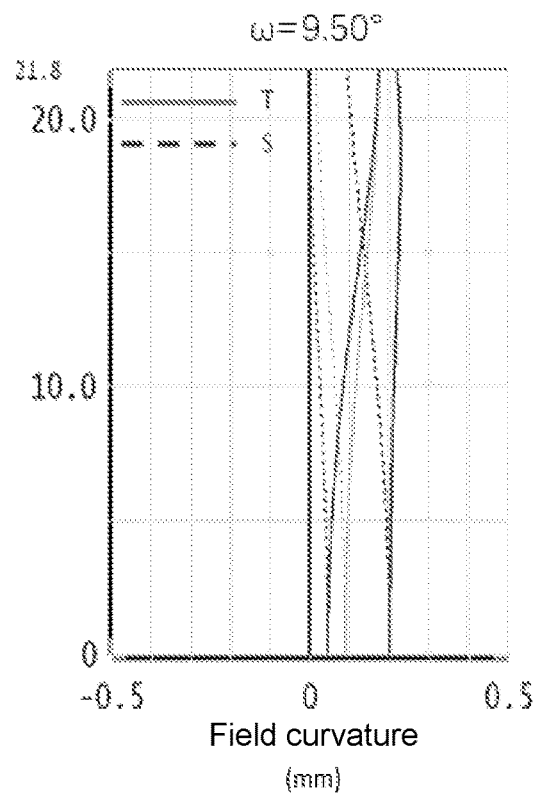
FIG. 20 shows the field curvature chart of Embodiment 3 when focusing at the nearest distance.
Figure 21:
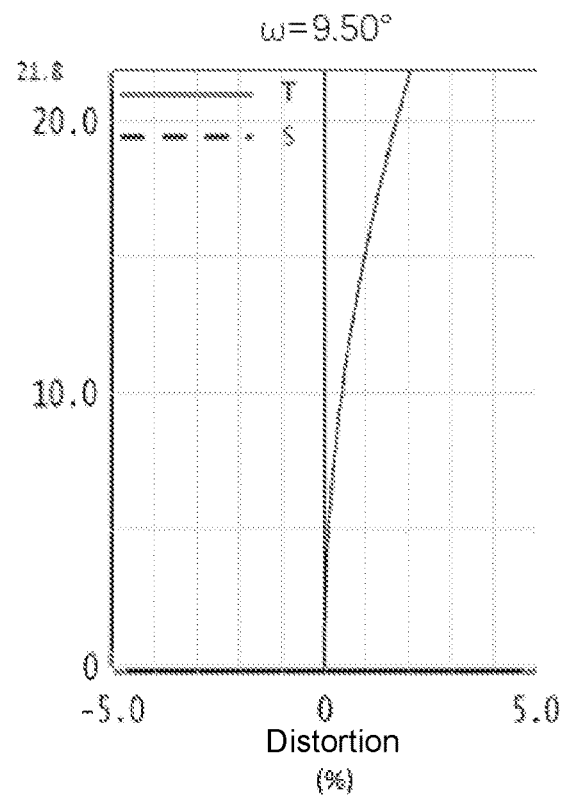
FIG. 21 shows the distortion chart of Embodiment 3 when focusing at the nearest distance.

FIGS. 16-18 show the spherical aberration, field curvature and distortion charts of Embodiment 3 when focusing at infinity. FIGS. 19-21 show the spherical aberration, field curvature and distortion charts of Embodiment 3 when focusing at the nearest distance. As shown in FIGS. 16-21, the telephoto lens of the present embodiment has good imaging effect.

Table 9 shows the conditional expressions (1)-(4) and the Vd values of each of the embodiments:

TABLE 9

| | Conditional expressions | Embodiment 1 | Embodiment 2 | Embodiment 3 |
|---|---|---|---|---|
| (1) | F1/F | 0.71 | 0.7 | 0.78 |
| (2) | Vd1a-Vd1b | 73.69 | 70.79 | 70.736 |
| (3) | F2/F | −0.52 | −0.51 | −0.32 |
| (4) | F3/F4 | −0.25 | −0.23 | −0.29 |
| | Vd | 94.577 | 94.577 | 94.577 |

The principles, features and advantages of the present invention are illustrated and described above. It should be understood for those skilled in the art that the scope of the present invention should not be limited by the above exemplary embodiments. Descriptions in the exemplary embodiments and the specification are for purposes of illustrating the principles of the present invention. Modifications and variations may be made without departing the spirit and scope of the present disclosure. Such modifications and variations fall within the scope of the present invention. The scope of the present invention is defined by the accompanying claims and their equivalents.

What is claimed is:

1. An internal focus large-aperture telephoto lens comprising, sequentially from an object side to an image side, a first lens assembly with positive focal power, a second lens assembly with negative focal power, an aperture stop, a third lens assembly with positive focal power, and a fourth lens assembly with negative focal power; when focusing from infinity to proximity, the second lens assembly moves along an optical axis towards the image side, the third lens assembly moves along the optical axis towards the object side, the first lens assembly and the fourth lens assembly remain static in position in relation to the image side; the first lens assembly comprises at least one meniscus lens and satisfies conditional expression as follows:

$$0.3 \le F1/F \le 1, \quad (1);$$

wherein, F represents focal length of the telephoto lens; F1 represents combined focal length of the first lens assembly; and the first lens assembly comprises, sequentially from the object side to the image side, a first lens with positive focal power, a second lens with positive focal power, a third lens with positive focal power, a fourth lens with negative focal power, a fifth lens with negative focal power and a sixth lens with positive focal power; the third lens and the fourth lens are combined to form a cemented lens assembly; the fifth lens and the sixth lens are combined to form a cemented lens assembly; the second lens and the sixth lens are meniscus lenses; the first lens, the second lens, the third lens and the sixth lens are extra-low dispersion lens.

2. The internal focus large-aperture telephoto lens of claim 1, wherein the first lens assembly comprises at least one lens with $Vd1 \ge 70$, wherein $Vd1$ is defined as Abbe number of a light beam with wavelength of 587.6 nm of the lens, and the first lens assembly satisfies conditional expression as follows:

$$(Vd1a - Vd1b) \ge 30, \quad (2);$$

wherein $Vd1a$ is Abbe number of the light beam with wavelength of 587.6 nm of the lens of the highest Abbe number in the first lens assembly; $Vd1b$ is Abbe number of the light beam with wavelength 587.6 nm of the lens of the lowest Abbe number in the first lens assembly.

3. The internal focus large-aperture telephoto lens of claim 1, wherein the second lens assembly comprises, sequentially from the object side to the image side, a seventh lens with positive focal power, an eighth lens with negative focal power and a ninth lens with negative focal power; the seventh lens and the eighth lens are combined to form a cemented lens assembly.

4. The internal focus large-aperture telephoto lens of claim 1, wherein the second lens assembly has a first lens surface which is proximal to the object side and convex towards the object side, and a second lens surface which is proximal to the image side and concave towards the object side.

5. The internal focus large-aperture telephoto lens of claim 3, wherein the second lens assembly has a first lens surface which is proximal to the object side and convex towards the object side, and a second lens surface which is proximal to the image side and concave towards the object side.

6. The internal focus large-aperture telephoto lens of claim 5, wherein the second lens assembly satisfies conditional expression as follows:

$$-0.9 \le F2/F \le 0, \quad (3);$$

wherein F represents focal length of the telephoto lens; F2 represents combined focal length of the second lens assembly.

7. The internal focus large-aperture telephoto lens of claim 1, wherein the third lens assembly comprises, sequentially from the object side to the image side, a tenth lens with positive focal power and an eleventh lens with negative focal power; the tenth lens and the eleventh lens are combined to form a cemented lens assembly.

8. The internal focus large-aperture telephoto lens of claim 7, wherein the fourth lens assembly comprises, sequentially from the object side to the image side, a twelfth lens with negative focal power, a thirteenth lens with positive focal power and a fourteenth lens with negative focal power; the twelfth lens and the thirteenth lens are combined to form a cemented lens assembly.

9. The internal focus large-aperture telephoto lens of claim 7, wherein the fourth lens assembly comprises, sequentially from the object side to the image side, a twelfth lens with positive focal power and a thirteenth lens with negative focal power.

10. The internal focus large-aperture telephoto lens of claim 8, wherein the fourth lens assembly satisfies conditional expression as follows:

$$-3 \le F3/F4 \le 0, \quad (4);$$

wherein F3 represents combined focal length of the third lens assembly; F4 represents combined focal length of the fourth lens assembly.

11. The internal focus large-aperture telephoto lens of claim 9, wherein the fourth lens assembly satisfies conditional expression as follows:

$$-3 \le F3/F4 \le 0, \quad (4);$$

wherein F3 represents combined focal length of the third lens assembly; F4 represents combined focal length of the fourth lens assembly.

* * * * *